United States Patent
Burkhardt et al.

(10) Patent No.: US 10,982,600 B2
(45) Date of Patent: Apr. 20, 2021

(54) METHOD AND DEVICE FOR CONTROLLING THE RESIDUAL GAS MASS REMAINING IN THE CYLINDER OF AN INTERNAL COMBUSTION ENGINE AFTER A GAS EXCHANGE PROCESS AND/OR THE PURGE AIR MASS INTRODUCED DURING A GAS EXCHANGE PROCESS

(71) Applicant: CPT Group GmbH, Hannover (DE)

(72) Inventors: Thomas Burkhardt, Neutraubling (DE); Jürgen Dingl, Regensburg (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 16/331,653

(22) PCT Filed: Aug. 8, 2017

(86) PCT No.: PCT/EP2017/070050
§ 371 (c)(1),
(2) Date: Mar. 8, 2019

(87) PCT Pub. No.: WO2018/046212
PCT Pub. Date: Mar. 15, 2018

(65) Prior Publication Data
US 2019/0242305 A1    Aug. 8, 2019

(30) Foreign Application Priority Data
Sep. 9, 2016   (DE) .................. 10 2016 217 222.0

(51) Int. Cl.
*F02D 13/02*  (2006.01)
*F02D 41/00*  (2006.01)
(Continued)

(52) U.S. Cl.
CPC .......... *F02D 13/0265* (2013.01); *F02B 47/08* (2013.01); *F02D 9/02* (2013.01);
(Continued)

(58) Field of Classification Search
CPC .. F02B 47/08; F02D 13/0207; F02D 13/0261; F02D 13/0265; F02D 41/0002;
(Continued)

(56) References Cited

U.S. PATENT DOCUMENTS

2002/0088229 A1* 7/2002 Almkvist ............ F02D 13/0253
                                                            60/602
2003/0221669 A1  12/2003 Henn et al. .................... 123/399
(Continued)

FOREIGN PATENT DOCUMENTS

DE   43 00 337 A1   7/1994  ............. F02D 13/02
DE   102 24 213 C1 10/2003  ............. F02D 41/14
(Continued)

OTHER PUBLICATIONS

Korean Office Action, Application No. 20197009973, 9 pages, dated Mar. 6, 2020.
(Continued)

*Primary Examiner* — Brandon D Lee
(74) *Attorney, Agent, or Firm* — Slayden Grubert Beard PLLC

(57) ABSTRACT

Various embodiments may include a method for controlling the residual gas mass remaining in a cylinder of an internal combustion engine after a gas exchange process and/or the purge air mass introduced into an exhaust manifold during a gas exchange process, the method comprising: specifying at least one of a desired residual gas mass or a purge air mass of the cylinder of the internal combustion engine; determining a setpoint position of an actuator which influences the
(Continued)

specified mass, based on an inverse residual gas model; and
setting the determined setpoint position of the actuator.

9 Claims, 2 Drawing Sheets

(51) Int. Cl.
  *F02B 47/08* (2006.01)
  *F02D 9/02* (2006.01)
  *F02D 9/04* (2006.01)
  *F02D 41/14* (2006.01)
(52) U.S. Cl.
  CPC ............ *F02D 9/04* (2013.01); *F02D 13/0207* (2013.01); *F02D 13/0261* (2013.01); *F02D 41/0002* (2013.01); *F02D 2009/0228* (2013.01); *F02D 2041/001* (2013.01); *F02D 2041/1434* (2013.01); *F02D 2200/0411* (2013.01); *F02D 2250/36* (2013.01); *Y02T 10/12* (2013.01); *Y02T 10/40* (2013.01)
(58) Field of Classification Search
  CPC ...... F02D 9/02; F02D 9/04; F02D 2009/0228; F02D 2041/001; F02D 2041/1433; F02D 2041/1434; F02D 2200/0411; F02D 2250/36; Y02T 10/18; Y02T 10/42
  See application file for complete search history.

(56) References Cited

U.S. PATENT DOCUMENTS

| | | | |
|---|---|---|---|
| 2007/0157715 A1 | 7/2007 | Boehm et al. | 73/114.42 |
| 2008/0077304 A1 | 3/2008 | Suzuki et al. | 70/102 |
| 2010/0083657 A1 | 4/2010 | Henning | 60/615 |
| 2010/0180876 A1 | 7/2010 | Leroy et al. | 123/704 |
| 2013/0131964 A1* | 5/2013 | Leroy | F02D 41/107 |
| | | | 701/105 |

FOREIGN PATENT DOCUMENTS

| | | | | |
|---|---|---|---|---|
| DE | 10 2004 041 708 B4 | 7/2006 | ............ | F02D 41/02 |
| DE | 10 2006 061 695 A1 | 8/2007 | ............ | F02D 23/02 |
| DE | 10 2008 022 644 A1 | 11/2009 | ............ | F02D 13/02 |
| DE | 10 2008 048 679 A1 | 4/2010 | ............ | F02B 37/12 |
| DE | 10 2011 013 481 A1 | 9/2012 | ............ | F01B 41/00 |
| DE | 10 2014 000 396 A1 | 7/2015 | ............ | F02D 21/08 |
| JP | 2001263104 A | 9/2001 | ............ | F02D 13/02 |
| JP | 2007255200 A | 10/2007 | ............ | F01L 1/34 |
| JP | 2008075549 A | 4/2008 | ............ | F02B 33/00 |
| JP | 2013249748 A | 12/2013 | ............ | F02D 13/02 |
| WO | 2018/046212 A1 | 3/2018 | ............ | F02B 47/08 |

OTHER PUBLICATIONS

Leroy et al., "Modeling Fresh Air Charge and Residual Gas Fraction on a Dual Independent Variable Valve Timing SI Engine", SAE International Journal of Engines, 1 page—Abstract, Apr. 14, 2008.

German Office Action, Application No. 10 2016 217 222.0, 6 pages, dated Dec. 20, 2016.

International Search Report and Written Opinion, Application No. PCT/EP2017/070050, 20 pages, dated Dec. 6, 2017.

* cited by examiner

METHOD AND DEVICE FOR CONTROLLING THE RESIDUAL GAS MASS REMAINING IN THE CYLINDER OF AN INTERNAL COMBUSTION ENGINE AFTER A GAS EXCHANGE PROCESS AND/OR THE PURGE AIR MASS INTRODUCED DURING A GAS EXCHANGE PROCESS

CROSS-REFERENCE TO RELATED APPLICATIONS

This application is a U.S. National Stage Application of International Application No. PCT/EP2017/070050 filed Aug. 8, 2017, which designates the United States of America, and claims priority to DE Application No. 10 2016 217 222.0 filed Sep. 9, 2016, the contents of which are hereby incorporated by reference in their entirety.

TECHNICAL FIELD

The present disclosure relates to internal combustion engines. Various embodiments may include methods and/or devices for controlling the residual gas mass remaining in a cylinder of an internal combustion engine after a gas exchange process and/or the purge air mass introduced into the exhaust manifold during a gas exchange process.

BACKGROUND

During the operation of a 4-stroke internal combustion engine, exchange of the gases in the cylinder during the exhaust and intake stroke is generally incomplete. Usually, some of the combustion gas which is formed by the combustion of the fuel remains in the cylinder after the closure of the outlet valve and participates in the following combustion cycle as "residual gas". For internal combustion engines without valve overlap, the residual gas mass, i.e. the mass of residual gas remaining in the cylinder when the outlet valve is closed, is determined primarily by the dead volume of the cylinder at top dead center of the piston and by the phase angle of the outlet camshaft as well as by the exhaust manifold pressure and the exhaust gas temperature. In the case of internal combustion engines with valve overlap, the residual gas quantity is additionally influenced by the gas pressures and gas temperatures in the intake pipe and in the exhaust manifold during valve overlap.

In full-load operation of an internal combustion engine, residual gas is unwanted since it displaces a corresponding volume of fresh air in the cylinder, with which an additional fuel quantity could be burnt and hence the engine power could be increased. At most operating points of the internal combustion engine, the exhaust manifold pressure is higher than the intake pipe pressure. At such operating points, the residual gas mass can be increased relative to operating points with little or no valve overlap by setting or increasing a valve overlap by means of camshaft phase adjustment.

At a number of other operating points of the internal combustion engine, however, the intake pipe pressure may be higher than the exhaust manifold pressure. At these operating points, the residual gas mass can be reduced relative to operating points with little or no valve overlap by setting or increasing a valve overlap by means of camshaft phase adjustment. At full-load operating points with a positive purge gradient, i.e. at operating points at which the intake pipe pressure is greater than the exhaust manifold pressure during the valve overlap, combustion gas is selectively flushed out into the exhaust manifold by setting or increasing a valve overlap, thereby reducing the residual gas mass and, as a result, increasing the cylinder air mass and the power of the internal combustion engine. This measure is referred to as flushing or scavenging. When the valve overlap is increased or the positive purge gradient is increased, the combustion gas is completely flushed out and some of the fresh air is flushed immediately into the exhaust manifold. This portion of the fresh air is referred to as purge air. The mass of fresh air flowing into the exhaust manifold during a gas exchange is referred to as the purge air mass. A mathematical model for calculating the residual gas mass and the purge air mass is referred to as a residual gas model.

To maximize the cylinder air mass and hence the power of the internal combustion engine, it should be possible to selectively reduce the residual gas mass and to lower it to zero. Control of the residual gas mass is necessary for this purpose. If flushing causes so much air to enter the exhaust manifold that the functioning of the catalytic converter is temporarily restricted, the pollutant emissions of the internal combustion engine rise sharply. To enable the influence of scavenging on emissions to be controlled, control of the air mass in the exhaust gas is necessary.

It is known that the actuators of an internal combustion engine which control scavenging, which include especially the camshaft phase adjusters, can be subjected to pilot control by way of global operating parameters of the internal combustion engine, e.g. the rotational speed, torque demand etc.

SUMMARY

The teachings of the present disclosure describe methods and/or devices for controlling the residual gas mass in the cylinder and/or the purge air mass in the exhaust gas of an internal combustion engine, upon application of which the exhaust gas emissions are sufficiently low to meet legal emissions requirements in all environmental and operating conditions of the internal combustion engine, and the cylinder air mass and, as a result, the power of the internal combustion engine, are maximized.

For example, some embodiments include a method for controlling the residual gas mass remaining in a cylinder of an internal combustion engine after a gas exchange process and/or the purge air mass introduced into an exhaust manifold during a gas exchange process, the method having the following steps: specifying a desired residual gas mass and/or purge air mass of the cylinder of the internal combustion engine, determining a setpoint position of an actuator which influences the residual gas mass and/or the purge air mass, using the specified residual gas mass and/or purge air mass and an inverse residual gas model, and setting the determined setpoint position of the actuator which influences the residual gas mass and/or the purge air mass.

In some embodiments, the setpoint positions of a plurality of actuators which influence the residual gas mass and/or the purge air mass are determined and setting of the determined setpoint positions of the actuators which influence the residual gas mass and/or the purge air mass is performed.

In some embodiments, an actuator which influences the residual gas mass and/or the purge air mass is an inlet cam phase adjuster.

In some embodiments, an actuator which influences the residual gas mass and/or the purge air mass is an outlet cam phase adjuster.

In some embodiments, an actuator which influences the residual gas mass and/or the purge air mass is a positioner for influencing the intake pipe pressure.

In some embodiments, an actuator which influences the residual gas mass and/or the purge air mass is a positioner for influencing the exhaust manifold pressure.

In some embodiments, the specified residual gas mass in full-load operation of the internal combustion engine is in the region of 0% of the total gas mass of the cylinder.

In some embodiments, the specified residual gas mass in partial-load operation of the internal combustion engine is in the range between 0% and 30% of the total gas mass of the cylinder.

As another example, some embodiments include a device for controlling the residual gas mass remaining in the cylinder of an internal combustion engine after a gas exchange process and/or the purge air mass introduced into the exhaust manifold of the internal combustion engine during a gas exchange process, characterized in that it has a control device which is designed for carrying out a method as described above.

BRIEF DESCRIPTION OF THE DRAWINGS

Further characteristics of devices and/or methods incorporating the teachings of the present disclosure emerge from the exemplary explanation thereof below on the basis of the figures. In the drawings.

DETAILED DESCRIPTION

In some embodiments, a method for controlling the residual gas mass and/or the purge air mass has the following steps:
  specifying either a desired residual gas mass and/or purge air mass of a cylinder of the internal combustion engine,
  determining a setpoint position of an actuator which influences the residual gas mass and/or the purge air mass, using the specified residual gas mass and/or purge air mass and an inverse residual gas model, and
  setting the determined setpoint position of the actuator which influences the residual gas mass and/or the purge air mass.

An inverse residual gas model mean an inversion of a residual gas model configured in such a way that it is possible, from a specification either of a required residual gas mass or of a required purge air mass, to determine the position, required for this purpose, of an actuator which influences the residual gas mass and/or the purge air mass. Said methods offer the possibility of controlling the residual gas mass and/or the purge air mass in the exhaust manifold and makes it possible, for example, to maintain a desired exhaust gas composition in the scavenging mode and to restrict the exhaust gas emissions in all environmental and operating conditions of the internal combustion engine to the legally specified limits. A catalytic converter arranged in the exhaust gas tract remains in its effective operating range.

Figure 1:
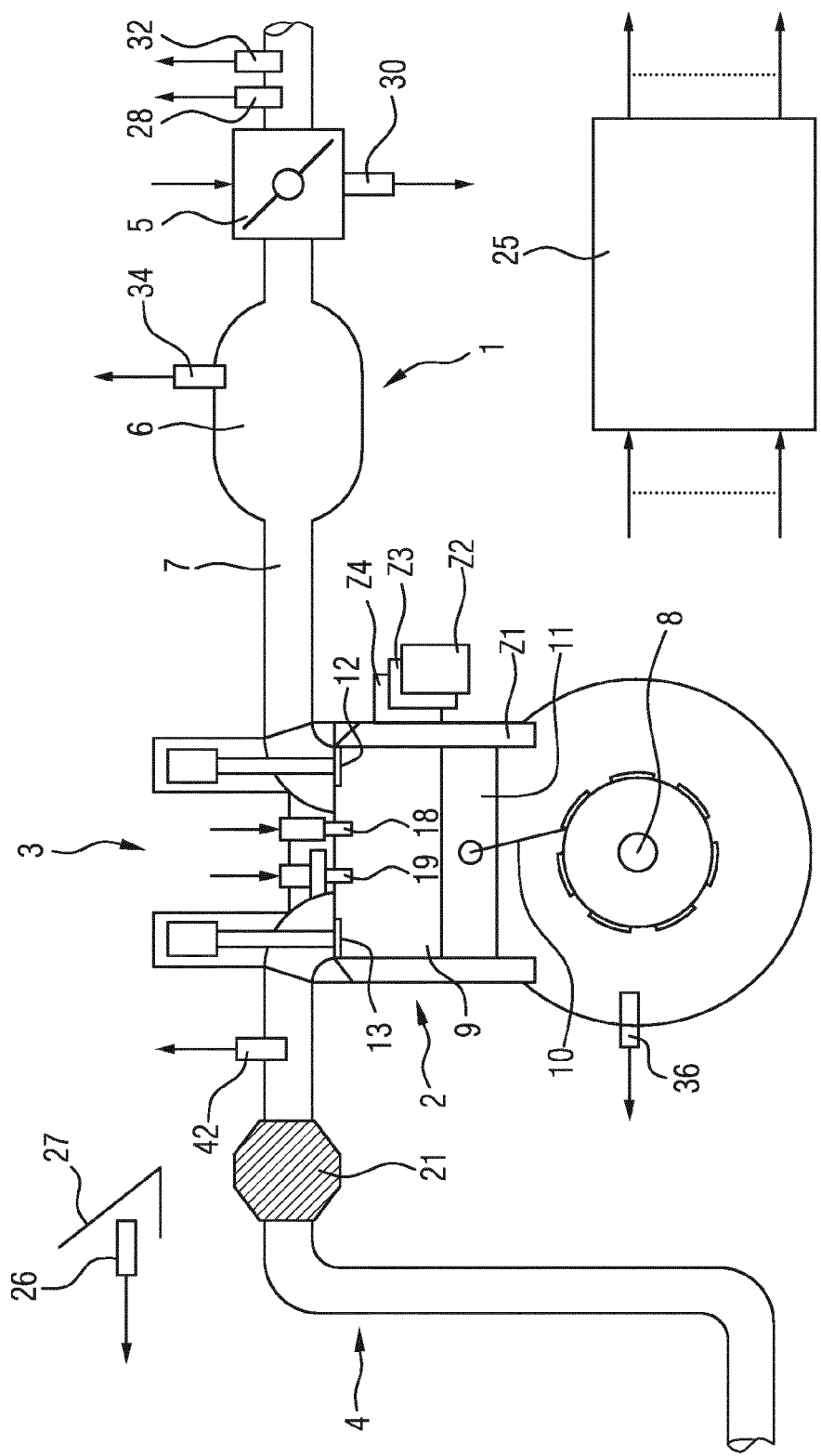
FIG. 1 shows an internal combustion engine with an associated control device incorporating teachings of the present disclosure.

FIG. 1 shows an internal combustion engine, which comprises an intake tract 1, an engine block 2, a cylinder head 3 and an exhaust tract 4. A control device 25 is assigned to this internal combustion engine. The intake tract 1 comprises a throttle valve 5, a manifold 6 and an intake pipe 7, which is fed towards a cylinder Z1 via an intake duct into a combustion chamber 9 of the engine block 2. The engine block 2 comprises a crankshaft 8, which is coupled via a connecting rod 10 to a piston 11 of a cylinder Z1. In addition to cylinder Z1, the internal combustion engine preferably comprises further cylinders Z2, Z3, Z4. However, the internal combustion engine can also comprise any other desired number of cylinders. The internal combustion engine is arranged in a motor vehicle.

An injection valve 18 and a spark plug 19 are arranged in the cylinder head 3. Alternatively, the injection valve 18 can also be arranged in the intake pipe 7. Arranged in the exhaust gas tract 4 is an exhaust gas catalytic converter 21, which may comprise a three-way catalytic converter.

An inlet cam phase adjuster, which is coupled to the crankshaft 8 and to an inlet camshaft, is furthermore provided. The inlet camshaft is coupled to a gas inlet valve of the respective cylinder. The inlet cam phase adjuster is designed to allow adjustment of a phase of the inlet camshaft with respect to the crankshaft 8. An outlet cam phase adjuster, which is designed to adjust a phase of an outlet camshaft with respect to the crankshaft 8 is furthermore provided, wherein the outlet camshaft is coupled to a gas outlet valve 13.

A switching flap or some other switching mechanism for changing an effective intake pipe length in the intake tract 1 is furthermore also provided. Moreover, one or more swirl flaps can also be provided. A charger, which can be designed as an exhaust gas turbocharger, for example, and comprises a turbine and a compressor, can furthermore also be provided.

The control device 25 is assigned sensors which acquire various measurement variables and determine in each case the measured value of the measurement variable. Operating variables of the internal combustion engine comprise the measurement variables and variables derived from the measurement variables. The control device 25 is designed to determine, as a function of at least one measurement variable, manipulated variables, which are then converted into one or more actuation signals for controlling the final control elements by means of corresponding actuating drives.

The sensors are, for example, a pedal position encoder 26, which detects an accelerator pedal position of an accelerator pedal 27, an air mass sensor 28, which detects an air mass flow upstream of the throttle valve 5, a throttle valve position sensor 30, which detects an opening angle of the throttle valve 5, an ambient pressure sensor 32, which detects an ambient pressure of an environment of the internal combustion engine, an intake pipe pressure sensor 34, which detects an intake pipe pressure in the manifold, a crankshaft angle sensor 36, which detects a crankshaft angle, to which a rotational speed of the internal combustion engine is then assigned.

An exhaust gas probe 42, which is arranged upstream of the exhaust gas catalytic converter 21 and detects a residual oxygen content of the exhaust gas of the internal combustion engine and the measurement signal of which represents an air/fuel ratio upstream of the exhaust gas probe 42 before combustion, is furthermore provided. An inlet camshaft sensor and an outlet camshaft sensor are provided to acquire the position of the inlet camshaft and of the outlet camshaft. Moreover, a temperature sensor is provided, which detects an ambient temperature of the internal combustion engine, as is a further temperature sensor, the measurement signal of which represents an intake air temperature in the intake tract 1. An exhaust gas pressure sensor, the measurement signal of which represents an exhaust manifold pressure, i.e. a pressure in the exhaust gas tract 4, can furthermore also be provided.

Additional control elements may include, for example, one or more of the following components: the throttle valve 5, the gas inlet and gas outlet valves 12, 13, the injection valve 18, the inlet cam phase adjuster, the outlet cam phase adjuster, the spark plug 19, a wastegate adjuster, a swirl flap, an exhaust gas flap and an exhaust gas recirculation valve.

Internal combustion engines operating on the four-stroke principle draw the air intended for burning the fuel into the respective cylinder Z1 to Z4 during the intake stroke by means of gas inlet valves 12, which open for this purpose. The exhaust gases formed in the cylinders Z1 to Z4 by the combustion of the fuel are expelled into the exhaust gas tract 4 in the exhaust stroke through gas outlet valves 13, which open for this purpose. Here, the air mass which would just fill the entire swept volume of the cylinder Z1 to Z4, i.e. the difference between the cylinder volumes at bottom and top dead center, at the ambient pressure prevailing around the internal combustion engine and the ambient temperature prevailing around the internal combustion engine, while the cylinder dead volume that remains at top dead center is filled with exhaust gas, is referred to as the theoretically maximum possible enclosed cylinder air mass.

In actual engine operation, the fresh air charge which participates in the combustion of the fuel differs from the theoretically maximum possible enclosed fresh air charge for various reasons, particularly because of deviations of the current intake pipe pressure from ambient pressure and of the current intake pipe temperature from the ambient temperature. Another reason for this is that the exhaust gas produced in a preceding operating cycle has not been completely expelled from the respective cylinder Z1 to Z4. The combustion gas which remains in the cylinder Z1 to Z4 or in the intake tract 1 of the internal combustion engine after the closure of the gas outlet valves 13 is referred to as residual gas.

Another reason is that the combustion gas is partially or completely flushed out of the dead volume into the exhaust manifold at operating points with valve overlap if a pressure gradient from the intake pipe to the exhaust manifold occurs. This increases the cylinder air mass and more fuel can be burned, with the engine power rising. Another reason is that, at operating points with valve overlap, some of the inlet air mass drawn in by the internal combustion engine via the gas inlet valve during the gas inlet valve opening phase may be flushed through cylinder Z1 into the exhaust manifold if a pressure gradient from the intake pipe to the exhaust manifold occurs. This is referred to as scavenging.

If this scavenging causes so much air to enter the exhaust manifold that the functioning of the catalytic converter arranged in the exhaust gas tract is temporarily restricted, the pollutant emissions of the internal combustion engine rise sharply. This unwanted sharp rise in the pollutant emissions is prevented in methods incorporating the teachings herein by virtue of the fact that control of the air mass flow discharged into the exhaust manifold of the internal combustion engine is performed. This is explained by means of the additional figures.

Figure 2:
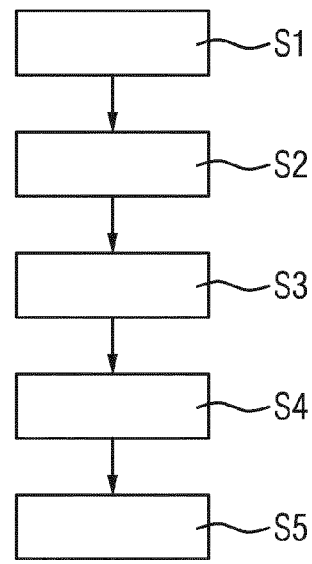
FIG. 2 shows a flow diagram to explain a method for controlling the residual gas mass in the cylinder and/or the air mass discharged into an exhaust manifold incorporating teachings of the present disclosure.

FIG. 2 shows a flow diagram to illustrate a method for controlling the residual gas mass and/or the air mass flow discharged into the exhaust manifold of an internal combustion engine. In some embodiments, a desired residual gas mass or a desired purge air mass of a cylinder of the internal combustion engine is specified in a first step S1. If the internal combustion engine is currently in a full-load mode, the desired residual gas mass is 0% of the total gas mass of the cylinder. If, on the other hand, the internal combustion engine is in a partial-load mode, the specified residual gas mass is in the range between 0% and 30% of the total gas mass of the cylinder.

In a subsequent second step S2, a setpoint position of an actuator which influences the residual gas mass and/or the purge air mass is determined, using the specified residual gas mass or the specified purge air mass and an inverse residual gas model. The actuators which influence the residual gas mass and the purge air mass are, in particular, the inlet cam phase adjuster, the outlet cam phase adjuster, a positioner for influencing the intake pipe pressure, e.g. a throttle valve, and a positioner for influencing the exhaust manifold pressure, e.g. a wastegate position adjuster. In this second step, a setpoint position of an actuator which influences the residual gas mass and the purge air mass can be determined or the setpoint positions of two or more of these actuators which influence the residual gas mass and the purge air mass can be determined.

In a subsequent third step S3, the determined setpoint position of the actuator which influences the residual gas mass and/or the purge air mass is set or the determined setpoint positions of the actuators which influence the residual gas mass and/or the purge air mass are set.

In some embodiments, a combustion process is then carried out in the cylinder in a fourth step S4. After the completion of the combustion process, the combustion gas is then expelled from the cylinder into the exhaust manifold of the internal combustion engine in a fifth step S5.

Where partial-load operation of the internal combustion engine is present, for example, the residual gas mass can be specified in such a way that the cylinder is flushed out without the occurrence of scavenging. Where full-load operation is present, the residual gas mass is furthermore specified as zero.

By increasing the specified residual gas mass in the cylinder, it is possible in principle to ensure that a reduction in the air mass in the cylinder takes place owing to the displacement effect which then arises. In the case of a spark ignition engine, this causes a reduction in the torque and increases the efficiency of the engine through the avoidance of any need to throttle the fresh air supply.

Figure 3:
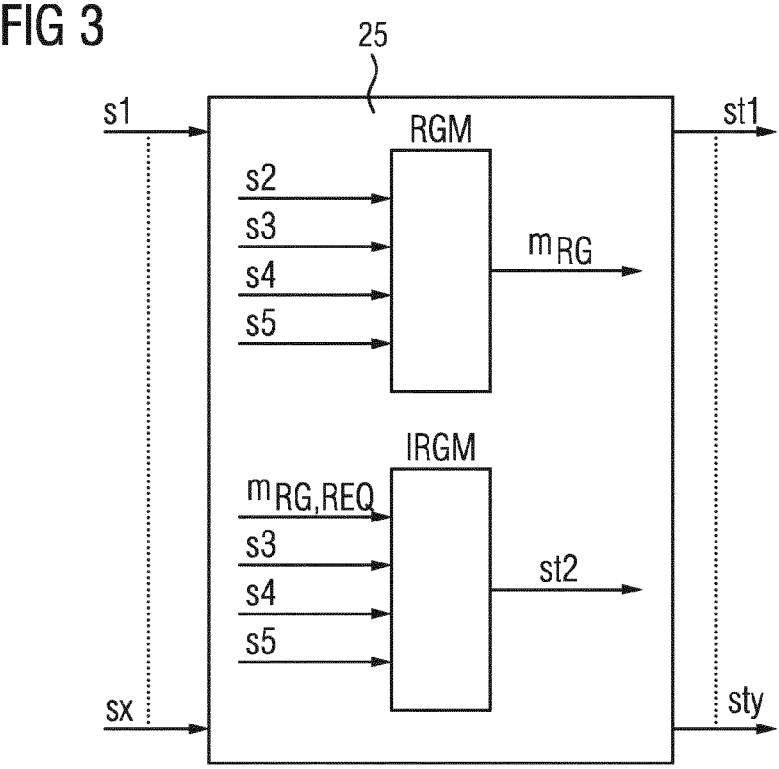
FIG. 3 shows a more detailed illustration of the control device shown in FIG. 1.

FIG. 3 shows a more detailed illustration of the control device 25 shown in FIG. 1. This control device is supplied with input signals s1 to sx, which comprise the abovementioned sensor signals, signals derived therefrom, further sensor signals and/or signals derived from the further sensor signals. These signals are used by the control device to identify the instantaneous operating state of the internal combustion engine and to prepare control signals st1 to sty for the actuators of the internal combustion engine. Among the means used by the control device to identify the instantaneous operating state of the internal combustion engine and to supply said control signals are a residual gas model RGM and an inverse residual gas model IRGM.

By means of the residual gas model and using the input signals s2, s3, s4 and s5 and stored software, the residual gas mass $m_{RG}$ is determined. Input signal s2 comprises, for example, signals which are derived from the inlet cam phase sensor and describe the phase angle of the inlet camshaft. Input signal s3 comprises, for example, signals which are derived from the outlet cam phase sensor and describe the phase angle of the outlet camshaft. Input signal s4 comprises, for example, signals which are derived from the intake pipe pressure sensor and describe the intake pipe pressure. Input signal s5 comprises, for example, signals which are derived from the wastegate position sensor and describe the position of the wastegate valve.

In some embodiments, the inverse residual gas model IRGM is supplied with input signals $m_{RG,REQ}$, s3, s4 and s5. Input signal $m_{RG,REQ}$ is a specified desired residual gas mass. Input signal s3 comprises, for example, signals which are derived from the outlet cam phase sensor and describe the phase angle of the outlet camshaft. Input signal s4 comprises, for example, signals which are derived from the intake pipe pressure sensor and describe the intake pipe pressure. Input signal s5 comprises, for example, signals which are derived from the wastegate position sensor and describe the position of the wastegate valve.

Using these input signals, which may include, in particular, a specified desired residual gas mass, the inverse residual gas model IRGM determines control signals for setting a setpoint position of one or more actuators which influence the residual gas mass. These actuators include, in particular, an inlet cam phase adjuster, an outlet cam phase adjuster, a positioner for influencing the intake pipe pressure, e.g. a throttle valve, and a positioner for influencing the exhaust manifold pressure, e.g. a wastegate position adjuster.

Consequently, the inverse residual gas model IRGM is provided for the purpose of determining control signals for adjusting one or more actuators which influence the residual gas mass and/or the purge air mass, using a specified desired residual gas mass and/or purge air mass, further input signals and stored software, in order to influence the residual gas mass in such a way that a desired cylinder air mass and a desired purge air mass are set.

LIST OF REFERENCE SIGNS

1 Intake tract
2 Engine block
3 Cylinder head
4 Exhaust gas tract
5 Throttle valve
6 Manifold
7 Intake pipe
8 Crankshaft
9 Combustion chamber
10 Connecting rod
11 Piston
12 Gas inlet valve
13 Gas outlet valve
18 Injection valve
19 Spark plug
21 Exhaust gas catalytic converter
25 Control device
26 Pedal position encoder
27 Accelerator pedal
28 Air mass sensor
30 Throttle valve position sensor
32 Ambient pressure sensor
34 Intake pipe pressure sensor
36 Crankshaft angle sensor
IRGM Inverted residual gas model
RGM Residual gas model
$m_{RG}$ Specified residual gas quantity
s1-sx Sensor signals
st1-sty Control signals
S1-S5 Method steps
Z1-Z4 Cylinders

What is claimed is:

1. A method for controlling the residual gas mass remaining in a cylinder of an internal combustion engine after a gas exchange process and/or the purge air mass introduced into an exhaust manifold during a gas exchange process, the method comprising:
    specifying at least one of a desired residual gas mass or a purge air mass of the cylinder of the internal combustion engine corresponding to an instantaneous operating state of the internal combustion engine identified based on sensor signals including at least one of: phase angle of the inlet camshaft, a phase angle of the outlet camshaft, an intake pipe pressure, and a position of a wastegate valve;
    determining a setpoint position of an actuator which influences the specified mass, based on an inverse residual gas model; and
    setting the determined setpoint position of the actuator.
2. The method as claimed in claim 1, further comprising:
    determining setpoint positions of a plurality of actuators which influence the specified mass; and
    setting the determined setpoint positions of the plurality of actuators.
3. The method as claimed in claim 1, wherein the actuator comprises an inlet cam phase adjuster.
4. The method as claimed in claim 1, wherein the actuator comprises an outlet cam phase adjuster.
5. The method as claimed in claim 1, wherein the actuator comprises a positioner for influencing a pressure prevailing in an intake pipe of the internal combustion engine.
6. The method as claimed in claim 1, wherein the actuator comprises a positioner for influencing a pressure prevailing in the exhaust manifold.
7. The method as claimed in claim 1, wherein the specified residual gas mass in full-load operation of the internal combustion engine is approximately 0% of a total gas mass of the cylinder.
8. The method as claimed in claim 1, wherein the specified residual gas mass in partial-load operation of the internal combustion engine is in the range between 0% and 30% of a total gas mass of the cylinder.
9. A device for controlling the residual gas mass remaining in the cylinder of an internal combustion engine after a gas exchange process and/or the purge air mass introduced into the exhaust manifold of the internal combustion engine during a gas exchange process, the device comprising:
    a processor; and
    a memory storing instructions, the instructions, when loaded and executed by the processor, configure the processor to:
    specify at least one of a desired residual gas mass or a purge air mass of the cylinder of the internal combustion engine corresponding to an instantaneous operating state of the internal combustion engine identified based on sensor signals including at least one of: phase angle of the inlet camshaft, a phase angle of the outlet camshaft, an intake pipe pressure, and a position of a wastegate valve;
    determine a setpoint position of an actuator which influences the specified mass, based on an inverse residual gas model; and
    set the determined setpoint position of the actuator.

* * * * *